United States Patent [19]

Putnam et al.

[11] 3,726,127
[45] Apr. 10, 1973

[54] METHODS FOR DETECTING PRESENCE AND MEASURING THE CONCENTRATION OF MINOR OVERLAPPED COMPONENTS IN GAS CHROMATOGRAPHY

[75] Inventors: Richard E. Putnam; Richard M. Augusty, both of Pittsburgh, Pa.

[73] Assignee: Westinghouse Electric Corporation, Pittsburgh, Pa.

[22] Filed: July 25, 1968

[21] Appl. No.: 747,666

[52] U.S. Cl. ................................................73/23.1
[51] Int. Cl. ...........................................G01n 31/08
[58] Field of Search........................................
73/23.1–27; 23/232 C; 55/67, 197, 386

[56] References Cited

UNITED STATES PATENTS

| | | | |
|---|---|---|---|
| 3,069,895 | 12/1962 | Burk | 73/23.1 |
| 3,365,931 | 1/1968 | MacRitchie | 73/23.1 |
| 3,412,241 | 11/1968 | Spence | 73/23.1 X |

OTHER PUBLICATIONS

"Computer Controlled Chromatographs"–P. P. Briggs–Control Engineering, Volume 14, No. 9, September 1967.

Gas Chromatography A. I. M. Keulemans–Reinhold Publishing Corporation, New York, 1957, pp. 36–39. "Analytical Methods" R. L. Pecsok Principles and Practice of Gas Chromatography, John Wiley and Sons, Inc. New York, 1959, pp. 145–150.

*Primary Examiner*—Richard C. Queisser
*Assistant Examiner*—C. E. Snee, III
*Attorney*—F. H. Henson and R. G. Brodahl

[57] ABSTRACT

Gas chromatography is disclosed in which the signal (FIGS. 2 and 3 derived from the resulting gas emitted by the absorbent column is evaluated by a digital computer (41 FIG. 1). Minor components of gas associated with a major component are detected by observing a difference between the area on one side of a major peak or maximum of a curve or time function corresponding to the major component and the area on the other side of the peak (FIGS. 5; 6a, 6b). The evaluation also includes determination of the number of points of inflection (FIGS. 6a, 6b) on each side of a major peak of a curve, one or no points on one side and two on the other (FIGS. 6a, 6b) indicates a minor component. Chromatographic apparatus is disclosed in which the recorders 51 are isolated from the gas measuring cell 23 and receive the signal to be recorded directly from the computer 41.

5 Claims, 15 Drawing Figures

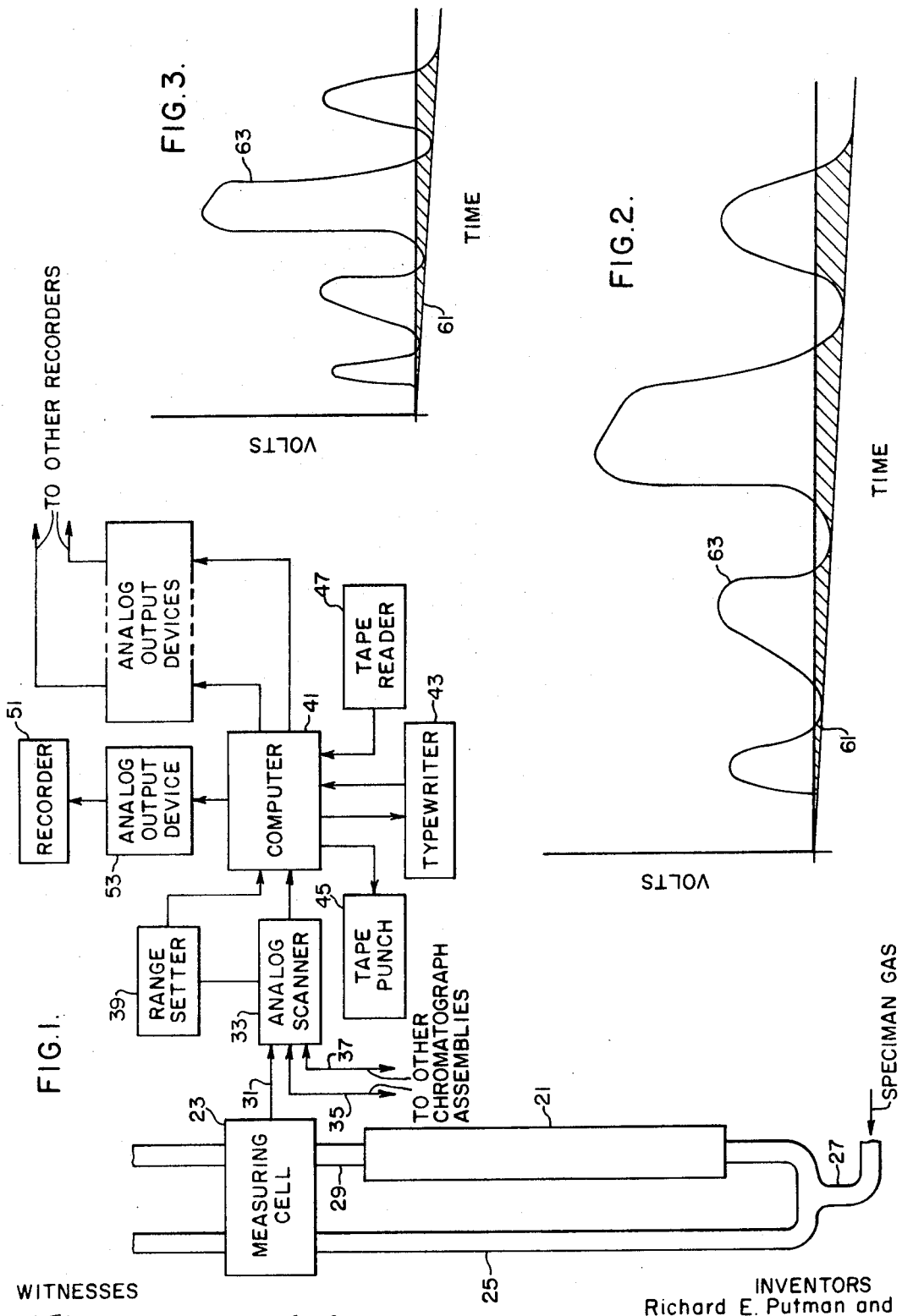

LINEAR IDEAL

NON-LINEAR IDEAL
ROUNDED

NON-LINEAR IDEAL
POINTED

METHODS FOR DETECTING PRESENCE AND MEASURING THE CONCENTRATION OF MINOR OVERLAPPED COMPONENTS IN GAS CHROMATOGRAPHY

BACKGROUND OF THE INVENTION

This invention relates to the art of detection and measurement and has particular relationship to gas chromatography. Gas chromatography is a gas measurement and identification process based on the property of certain substances or media to absorb gases or vapors in selectively different quantities. Typical media are kaolin, Celite (545) and diatomaceous earth fire brick (Johns-Manville C–22), in granular form (60 to 80 mesh) impregnated with a liquid, typically diisodecylphthalate, or 2,3-dimethylbutane and 3-methylpentane. Typically the ratio of liquid to solid by weight is 40 to 100. Such a medium has different gas-saturation volumes for different gases.

When a specimen of a gas is passed through this medium each component of the specimen is absorbed until the medium is saturated by it. It then proceeds along the column until the resulting quantity of a component is emitted by the medium. Each component is emitted from the medium at a time interval, after the specimen enters the medium, whose duration is dependent on the saturation-capacity of the medium for this component. The gaseous compounds in the medium are thus presented as a series of rounded or peaked pulses whose time of occurrence and duration is a function of the composition of the specimen. Typical gases to which this phenomenon is applicable are the hydrocarbon products of a petroleum cracking plant and chromatography has been applied to the identification, and determination of the relative quantities, of the products of such a plant. (See Gas Chromatography beginning page 290–316 Analytical Chemistry, Volume 28, No. 3, Mar. 1956; articles Martin Dimbat et al. 290–297, Fredericks et al. 297–303, Eggertsen et al 303–306, McLafferty 306–316). A cracking plant can be effectively monitored and operated if effective and reliable facilities are available for evaluating the chromatographic pulses or curves of such a plant and it is an object of this invention to provide such facilities.

In gas chromatography a measured specimen of the gas or vapor under observation is transmitted through the absorbing medium and the resulting gas emitted by the medium is transmitted through measuring means. The measuring means is connected to a recorder which produces a chromatogram; that is, a graph including a plurality of individual curves, each curve corresponding to one or more components of the specimen gas. The composition of the specimen can be determined by comparing the chromatogram produced for any specimen with a previously produced chromatogram for a known specimen.

In this application the overall time-signal produced by a specimen will be referred to as a "chromatograph" and the tracing of this signal on the tape of a recorder as a "chromatogram." At the output of the cell this signal is measured in volts (usually millivolts) as a function of time. The individual lobes of a chromatograph, which correspond to components or compounds of the specimen will be referred to as "time-functions," "lobes," "pulses" or "curves" and the maxima points of these time-functions-there may be more than one-as "maximum points" or "peaks." The "envelope" of each time-function is defined as the area embraced by the time-function and the base line. These envelopes may have single, double or multiple peaks. The time of occurrence of a curve or time functions helps to identify the corresponding component of the specimen and the area of each curve or, less accurately, the maximum height or peak of the curve, is a measure of the relative volumetric quantity of this component.

In accordance with the teachings of the prior art, (see articles above) gas chromatography is practiced by measuring the areas of the curves of the chromatograms with a planimeter or by producing templates of the curves and weighing them. This procedure has the disadvantage that it is time-consuming and costly in labor and does not avail the curve evaluation promptly. In addition this procedure is not reliable where the pulses or curves overlap. Attempts have been made to overcome the last-mentioned difficulty by attempting to find high resolution media and also by providing absorbing channels of great length and of small diameter. But the availability of high resolution media is limited and long absorption channels of small diameter present serious problems in the transmission of the gas or vapor under test.

In addition the process of deriving the curves from the measuring means is confused, and the precision of the curves reduced, by the excessive noise which appears on the chromatograms produced by the recorder. This noise introduces difficulties in identifying components of the specimens which are of low magnitude.

It is an object of this invention to overcome the above-described difficulties and disadvantages and to provide a method of chromatography and chromatographic apparatus which shall avail reliable and precise data as to the composition of the gases under observation.

SUMMARY OF THE INVENTION

In accordance with this invention an automatic chromatographic method and automatic chromatographic apparatus are provided in which the output of the measuring means is evaluated by a computer which determines in detail and precisely and reliably the character of each component in the gas specimen. The electrical signal from the measuring means is converted into digital magnitudes and fed to the computer. A succession of time-functions are thus available for evaluation by the computer. The computer measures the half areas of the time functions and determines the number of points of inflexion of these functions and from this data yields the required information on the composition of the specimen.

The aspect of this invention involving the recording of chromatograms arises from the discovery that excessive noise in the output of the meaasuring means is produced by feedback from the recorder. In accordance with this invention the recorder is isolated from the measuring means and is supplied from the computer with the signal to be recorded. For the eventuality that the computer is disabled, or for other purposes, a selector switch may be provided to connect the output of the cell directly to the recorder.

To facilitate the understanding of the detailed description of this invention, it is desirable that the phenomenon of chromatography be described in detail and some of its concepts additionally defined. In chromatography according to this invention a succession of time functions each having a maximum are produced. The area under the time-functions is proportional to the volumetric amounts of the various compounds or components present in the specimen. It is a principle of chromatography that the elasped time ratios of the appearance of the various peaks is a constant for any one method and absorbent medium since these ratios are a function of the isotherms of the absorption-column liquid-solid phase and compounds. The isotherms are graphs in which is plotted, for different temperatures as parameters, the absorption of each compound or component in the liquid phase of the absorbing medium against the absorption in the gas phase of this medium. The constant time ratios referred to above are the ratios of the time intervals, after the start of a chromatographic operation, of the occurrence of one peak and the occurrence of another peak. If T1 is the interval after the start of the occurrence of peak 1 and T2 is the interval after start of the occurrence of peak 2, (T1/T2) is a constant under the conditions given.

The base line is defined at the commencement of the test by the signal level at the start of the test from which the first pulse rises. The signal level at the end of the test, when only carrier gas is flowing, determines the position of the base line at the end of the test. With certain samples the height of the base line at two other preselected points can also be established as part of the data collection program for a given method. From this data the slope of the base line may be determined for the two ends of the chromatograph together with the point of intersection if the slopes should not be the same. A base line shift is not always present but must be taken into account. It is caused by a change in cell characteristic, carrier gas flow, liquid phase deterioration or a deliberately-imposed temperature rise to assist compound separation.

Elapsed time for any time function is the time between the commencement of the test set by the operator pressing the start button, and the appearance of the time-function. Alternatively a selected peak may be used as a reference for elapsed time of other peaks. The elapsed time is different for different compounds included in a given method. For the same compound it varies from one method to another. The apparatus is initially calibrated with standard specimen and during this initial calibration, these elapsed times are established and stored in the memory core of the computer. At the end of the test on a production specimen, the new time-function positions are compared with those obtained during the initial calibration of the homologous specimens and a compensating factor calculated for the integrated areas. Preferably, one or two sharp time-functions are used as the basis for this calculation.

It is also desirable preliminarily to consider the waveforms of some of the pulses or time functions which are produced.

Linear chromatography occurs with compounds which have linear isotherms. The shapes of these functions appearing as chromatograms on the recorder chart can be closely approximated by a Gaussian distribution as a function of time.

Non-linear chromatogaphs occur with compounds or components which have non-linear isotherms. Their envelopes do not lend themselves to mathematical analysis but may be identified for the purpose of comparing with a standard.

Ideal chromatography may be linear or non-linear and occurs when the maxima are clearly separated from each other and the envelopes of the pulses or time functions do not merge.

Non-ideal chromatography occurs when the maxima of two or more compounds are so close together in time that their envelopes merge.

From a study of several different chromatograms corresponding to a given method, it is possible to write a program which identifies the typical shape of the envelope produced by a given compound.

In the practice of this invention the specimen is passed through the chromatographic medium and the measuring means and the following functions are performed.

1. The data is gathered.
2. Each time-function is analyzed; its gross area determined and the form of its envelope analyzed to detect unexpected compounds and minor compounds.
3. Correction, particularly in the area, is made for time-base changes.
4. Correction, particularly in the area, is made for base line drift.

BRIEF DESCRIPTION OF DRAWING

For a better understanding of this invention, both as to its organization and as to its method of operation, together with additional objects and advantages thereof reference is made to the following description taken in connection with the accompanying drawings, in which:

FIG. 1 is a diagrammatic view showing apparatus for practicing this invention and also showing a preferred embodiment of this invention;

FIGS. 2 and 3 show, with respect to different time basis, a chromatograph which is evaluated in the practice of this invention.

DETAILED DESCRIPTION OF THE INENTION

Figure 4A:
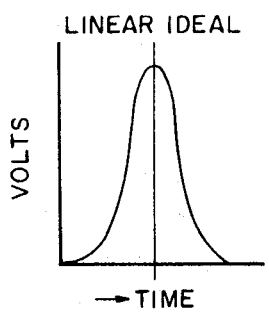
FIGS. 4a through 10 show various features of typical time functions encountered in the practice of this invention.

The apparatus shown in FIG. 1 includes a chromatograph channel 21 which may contain any of the absorbing media listed in the above-identified articles, or others, and may have the length and take any form (helical, for example) described in these articles. This apparatus also includes a measuring cell 23 for measuring the gas flow emitted by the channel 21. The cell 21 may measure thermal conductivity of the gas similarly to the cell of the Martin et al. article. A carrier gas which may be such gases as helium, argon, or hydrogen or mixtures of these gases is supplied to the channel 21 through a conductor or channel 25. A measured quantity (10 CC for example) of the specimen gas is injected into the conductor 25 through a conductor 27 so that the carrier and the specimen enter the absorbent medium in the channel 21.

The channel 25 passes through the cell 23 so that the thermal conductivity of the carrier gas is measured. The resulting gas emitted by the medium in channel 21 is also supplied to the cell 23 through a conductor or channel 29 so that its thermal conductivity may be compared to the conductivity of the carrier gas.

Each component or compound of the specimen gas is absorbed by the medium until the medium is saturated. Each such component then only flows after it has saturated the medium and conductor 29 carries a succession of controlled pulses corresponding to the composition of the specimen. The cell 25 has an electrical output 31 which produces a succession of electrical voltage signals or time functions on a base line. The base line may be set by initially transmitting through the conductor 29 only the carrier gas emitted by the channel 21.

The apparatus according to this invention includes an analogue scanner 33 to which the output 31 is connected. This scanner 33 may be supplied from other chromatograph assemblies or units similar to the one just described through conductors 35, 37, etc. The scanner 33 scans these conductors 31, 35, 37 and converts the signals on each in its turn into a digital signal. Each chromatograph unit may be supplied with a different specimen. The apparatus includes a range setter 39 with which the range for each conductor 31, 35, 37 may be set so that each signal is automatically at its most convenient magnitude on being converted.

The apparatus also includes a computer 41 having an adequate memory core (not shown) to which are connected an input/output typewriter 43, a tape punch 45 and a tape reader 47. The computer 41 may be observed and controlled by an operator from a console (not shown). The computer 41 has impressed thereon the digital output of the scanner 33 and evaluates the time-functions received. The core carries the time-functions of a plurality of calibration standard specima which may be compared with the output of the scanner for the corresponding specima under observation. The standard calibration time-functions may be produced on a tape and inserted in the core by the tape reader 47. The tape punch may produce a tape of the evaluation of the computer 41. Such evaluation may also appear on the typewriter. Typically the evaluation includes relationship between each time-function and the corresponding standard time function, area of time function, number and heights of peaks of time function and comparison of number of points of inflexion on each side of each peak.

The apparatus also includes a plurality of recorders 51 corresponding to the number of cells scanned by the scanner 33. The recorders 51 are isolated from the corresponding cells 23 but are supplied from the computer 41 through analogue output devices 53, one associated with each recorder 51, the signal being scaled in the computer to correspond to the range desired on the recorders. In setting this range for the recorders the computer bases its computations on the range set by the range setter 39 and on the desired range for the computer. The recorder produces chromatograms.

FIGS. 2 and 3 are graphs, in which voltage is plotted against time, of typical signals produced in the practice of this invention. The base line 61, which is set by flow only of the carrier gas both through conductor 25 and conductor 29, slopes downwardly because base line drift exists. The lobes 63 are the time functions corresponding to the components of the specimen. FIG. 3 is a plot for a specimen identical to that of FIG. 2 passed through an identical medium, at the same temperature, but with the carrier gas flowing at a substantially higher rate so that the time base 61 is contracted.

Figure 4B:
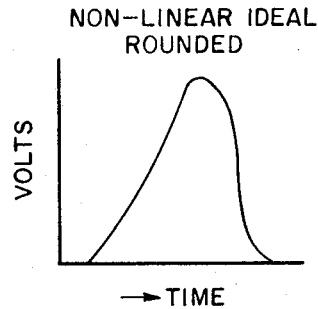
Figure 4C:
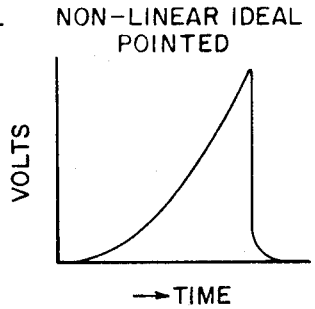

FIGS. 4a, 4b, 4c are graphs showing typical time functions encountered in the practice of this invention. Voltage is plotted against time. These functions are labeled appropriately. FIG. 4a shows a Gaussian function. FIGS. 4b and 4c are non-symmetric functions which do not lend themselves to analysis but their areas can be determined and they can be compared with corresponding calibration functions in the computer memory for a standard specimen.

Figure 5:
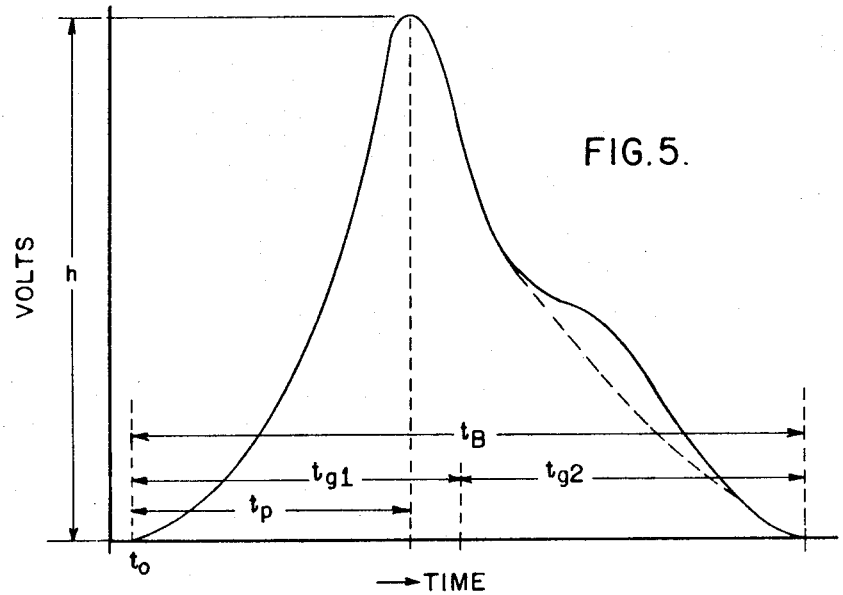

FIG. 5 is a graph showing a single time function having a single peak but at least two points of inflexion on the trailing slope. The important time intervals with reference to the start of the time function (initial low slope) are shown in FIG. 5 and are as follows:

$t_p$ = interval to occurrence of peak.

$t_{g1}$ = interval to occurrence of center of gravity of function.

$t_{g2}$ = interval from occurrence of center of gravity to end of trailing slope of function.

$t_B$ = duration of function.

$h$ = height of peak.

For a given method and component having characteristically a non-linear but normally ideal time function, it can be postulated that the proportional dimenions of the function will not change with concentration, i.e., the ratios to each other of time to peak ($t_p$), time to center of area ($t_{g1}$), time to end of chromatogram ($t_B$), and height ($h$) will always be the same.

From tests, the ratio ($t_{g1}/t_p$) can be determined for that component and stored in the memory core. When running a test, integration begins at $t_o$ and continues until $t_{g1}$ which can be predicted from $t_p$. This area is now stored and a new integration begins. This new integration ends at the base line. ($t_{g1}/t_p$) is an improper fraction if the larger area is to the right of the peak and a proper fraction if the larger area is to the left of the peak.

If no minor components are present, the area under line $t_{g1}$ should be equal to half the area under line $t_B$, i.e., area under $t_{g1}$ is equal to area under $t_2$. The volumetric quantity of a minor component is the difference between the area under $t_{g2}$ and the area under $t_{g1}$. The volumetric quantity of major component is equal to twice the smaller of the areas under $t_{g1}$ or $t_{g2}$.

Figure 6A:
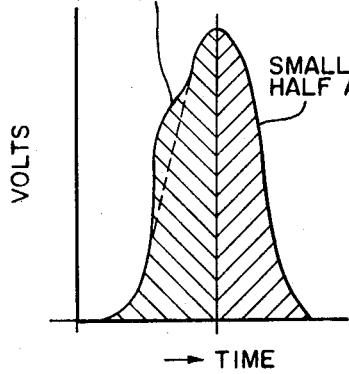
Figure 6B:
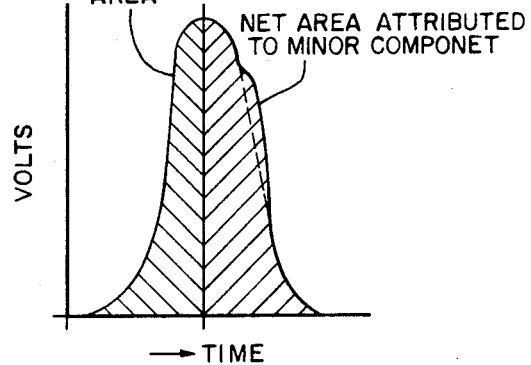

FIGS. 6a and 6b show linear-nonideal time functions and are labeled to show how the evaluation for these time functions is carried out.

Figure 7A:
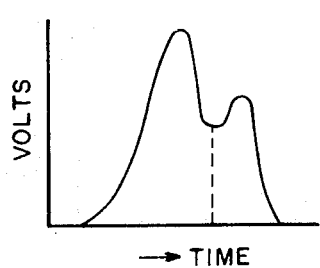
Figure 7B:
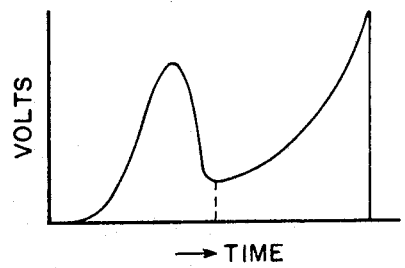

FIGS. 7a and 7b show nonideal multi-peak time functions. In this case the volumetric quantity of each component corresponding to a peak is determined by measuring the area of the time function under the peaks on each side of the broken line.

Figure 8:
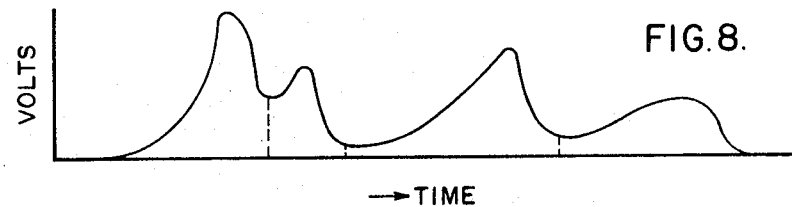

FIG. 8 is a graph of a part of a signal showing nonideal multi-peak time functions which are merged. In this case the areas under the peak are defined by broken lines and the volumetric quantity of each component is determined by measuring the area of the function under each peak and bounded by the function on one side and a broken line or by broken lines.

Figure 9A:
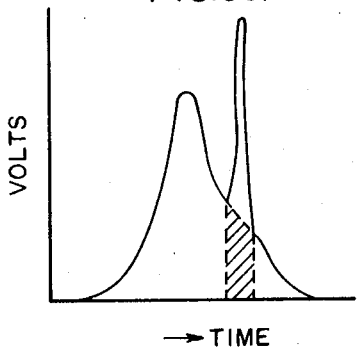
Figure 9B:
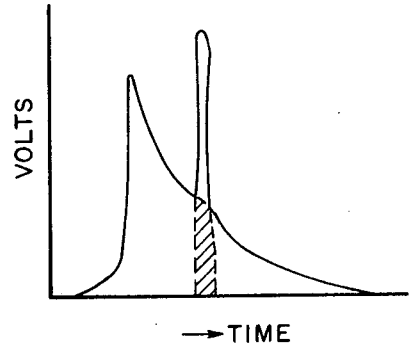

FIGS. 9a and 9b show nonideal-time functions with an additional sharp peak on the trailing edge of the function. In this case the volumetric quantity of the minor component is determined from the area only under the peaked curve, rising from the trailing edge of the principal function. The area of the trapezium shown in broken lines is included in the area corresponding to the main function. This area of the trapezium is subtracted from the area under the peaked curve to arrive at the quantity of the minor component.

Figure 10:
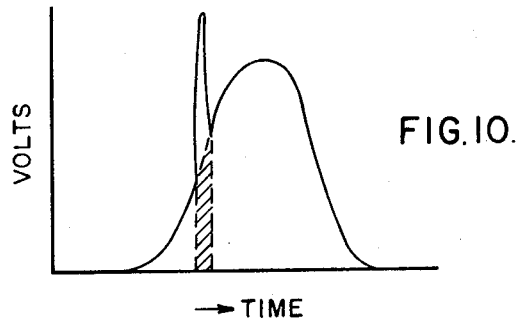

FIG. 10 shows a nonideal time function with the peak rising from the leading edge. The function shown in FIG. 10 is evaluated similarly to the function shown in FIGS. 9a and 9b.

In the typical practice of this invention the computer 41 is the Westinghouse PRODAC P-50 computer with 16K core memory. The analog input scanner 33 consists of a Scientific Equipment Laboratories analog-digital converter. Scanning rate is typically 100 points per second and the range setter 39 is capable of setting five ranges, e.g., 5, 10, 25, 50 and 500 millivolts. Any range can be used at any time with any point. The output from the converter 33 is a 14-bit binary word and has an accuracy of ± 0.2 percent of full scale at any range.

Where the recorders 51 are driven in parallel in the scanning of a corresponding number of cell outputs 31, automation is achieved by driving analogue outputs (53) from the computer so that they have the same percent of the current measuring range that the range setter 39 has selected for each output 31. The recorder 51 thus always works at its best sensitivity, and gain changes can be advised by the final print-out on the typewriter.

It is contemplated that 15 chromatographs, in a typical laboratory containing 30 instruments will be in operation at any one time. At a total scanning range of 100 points per second, and a chromatograph scanning rate of five times per second, 75 of 100 time units thus are taken up by the chromatograph scanning. The remaining 25 scans which are available per second are used to scan the output of a mass spectrometer located in the laboratory. The gain on any point can be selected so that the present output is not more than 80 percent of full scale. The programming is arranged to automatically adjust gain to give the best measurement accuracy and to avoid saturating the amplifier.

For the typical practice of this invention, 70 different methods were set up to analyze all the various production samples presented to the laboratory of a petroleum cracking plant. The methods have been selected to give good time-function separation and therefore best possible accuracy in chromatograph analysis. Each method is associated with a certain instrument, a specified column and the same group of compounds, all or only some of which may be present in the specimen submitted for test. Any time-functions produced by compounds not included in the appropriate group are integrated and only printed out as an area, without identification other than elapsed time value. The maximum duration of each method is established.

Initially the chromatograph is calibrated and the various factors stored in memory core. When analyzing production specima, the operator inserts via the typewriter or operator's console the following data:

1. Method number.
2. Sample point from which the specimen has been drawn.
3. Chromatograph number to be used for the analysis.

The operator then inserts the specimen, presses the start button and the computer commences to gather data until the termination of the test. The data is analyzed, corrected and printed out as complete test results, the computer and instrument then being set to accept the next specimen.

During the data gathering the scanning of the chromatograph commences and the recorder receives the appropriate signal and the base line is measured and stored. The recorder chart starts when the start button is depressed. Typically, latching relays are provided, which are latched by the depressing start button and unlatched by the depressing stop button or a computer contact.

During the scanning of the chromatograh outputs, the computer calculates for each one the slope of the curve and the rate of change of slope. As soon as the slope of the signal, regarded as a voltage at an output 31, exceeds 5 microvolts per second, integration commences; the point of commencement in time being noted. For any envelope integration is finally stopped when the slope has fallen below 5 microvolts per second. This point in time is also noted. Envelopes may contain more than one peak and this is determined from the rate of change of slope; that is, from points of inflexion. Areas are allocated to compounds according to the rules (*a*) through (*f*) stated below.

(This use of the points of inflexion is warranted. In any linear envelope there is one point of inflexion on each side of the peak. In any nonlinear envelope there may be no points of inflexion on either side of the peak. Any bump or lobe on even a straight line is associated with at least two points of inflexion. By counting the number of points of inflexion up to and away from each peak, one can determine whether an envelope identifies a pure compound or more than one compound.)

The computer 41 carries out computations separately for each side of a curve about the peak. It notes the number of points of inflexion up to the peak and notes the position of the peak in time, and stores the area of the part of the curve or time-function up to the peak. It then starts a new integration after the peak, noting the number of points of inflexion on the downward slope and continues to integrate until the slope falls to 5 microvolts per second. This may occur at the base line or occur at the bottom of a valley, if two peaks are close together.

Analysis of the various chromatographs, as shown in FIGS. 4a through 10, is carried out as follows:

a. If the envelope has no points of inflexion on either side of the peak or only one point of inflexion on each side of the peak (FIG. 4a), the two integrated areas are summed and stored; in this case the curve was produced by, and identifies, only one compound.

b. If the envelope has one point of inflexion on one side but two or more points of inflexion on the other side of the peak (FIGS. 6a, 6b), the area on the side containing only one point of inflexion is doubled and stored as the area for the major compound. The area of the minor compound identified by the envelope is calculated by adding the two areas together on either side of the peak and subtracting the area calculated for the major compound present. This net area for the minor compound would then be stored.

c. With an envelope having none or one point of inflexion on the leading slope, and one or none on the trailing slope but also a valley on the trailing edge which lies above the base line (FIGS. 7a, 7b), the two areas on either side of the valley are allocated to each major compound.

d. If a peak lies between two valleys (FIG. 8), the area corresponding to a component is that lying between the bottoms of the adjacent valleys on either side of the peak.

e. A sharp peak occurring on a trailing slope (FIGS. 9a, 9b) is revealed by a sudden reversal in slope (upwardly FIGS. 9a and 9b). The slope immediately prior to the reversal is stored together with the previously computed area and a new integration begins. This second integration stops when the slope has returned to the value previously stored. Another integration now begins and continues until the slope has fallen to 5 microvolts per second. From the area under the sharp peak is subtracted a trapezium (broken lines FIGS. 9a, 9b) having a time width corresponding to the interval between the instant when the first slope is stored and the instant when the slope returns to the value of the first slope. The mean height of the trapezium is equal to the mean value of the signal at these two instants.

This trapezium is subtracted from the area under the sharp peak (FIGS. 9a, 9b) to give the net area of the sharp peak which is allocated to the minor component whose peak time occurs at that point. The trapezium is added to the first integrated area and the last integrated area to give the total area allocated to the main component.

f. A sharp peak on the leading edge (FIG. 10) is manifest by a slope which suddenly approaches infinity. The slope just prior to this sudden increase in slope is stored, a new integration bgins and a similar procedure to that described in (e) is followed to calculate the areas.

Having now calculated the area attributed to each component which has been identified by the position of its time-function, a correction is applied to compensate for changes in time ratio for standard and for base line drift.

The slope of the base line is calculated from the heights of the base line as measured at different points in the program (FIGS. 2 and 3). This data may now be combined with the interval between the instant when the slope initially has a value of 5 microvolt/second and the instant when the slope returned to that magnitude of 5 microvolts per second. The areas of the trapeziums (shaded FIG. 2) under the various areas contributed by the base line may then be calculated. These areas are subtracted from the total area attributed to each component to give the net areas. These net areas are multiplied by the ratio of calibration intervals (for the standards) to actual intervals for selected "marker" peaks. All areas are multiplied by this factor to compensate for changes in the column or gas flow. Compensation for time ratios is effected by multiplying the computed area by the standard time interval) divided by the actual time (interval).

Each area so compensated is then multiplied by the area factor calculated for each component during the initial calibration so as to produce the volume of the component present in the sample analyzed. Standard calculation procedures are now applied to obtain mol percent, weight percent, liquid volume percent and sample properties such as average molecular weight and net heating value. The results are printed out in tabular form. Typically, 50 separate tests are run by the laboratory as a whole during each 24 hour period.

Typically, about 385 compounds are encountered. The following data is stored permanently in the memory core for these compounds.
1. Identification
2. Molecular weight
3. Specific Heat
4. Density For each of the 70 methods set up in the typical practice of this invention the following data is stored in the memory core for each component:
1. identification of component
2. Elapsed time from start to major peaks determined in standard calibration.
3. Area factor (e.g. time-secs./c.c.) calculated during standard calibration.
4. Peak type (single, multiple, linear, ideal, etc.)

Typically, there are a total of 511 sets of component data spread over the 70 different methods. For each of these methods, the maximum test running time is also stored in the core. The maximum number of tests running at any one time is typically 15.

While preferred embodiments of this invention have been disclosed herein, many modifications thereof are feasible. This invention should not be restricted except insofar as is necessitated by the spirit of the prior art.

We claim as our invention:

1. The method of determining the major components of the composition of a specimen of a gas and the minor components, if any, associated with each major component, the said method comprising passing said specimen, at a predetermined time rate, through a medium which absorbs, and is selectively saturated by, said major and minor components, passing the resulting gas progressively emitted by said medium through measuring means to derive a signal as a function of time dependent on the component composition of said gas and the rate at which the components of said composition saturate said medium, deriving a time-function for each said major component and the associated minor components, if any, at least one of said time-functions having at least one maximum point defining an axis of said time function at the instant which said maximum point occurs, any substantial asymmetry of said time-function about said axis resulting substantially only from the presence of said minor components, and the time of occurrence of said last-named function being dependent on the medium-saturation capability of said last-named components, and the area of said last-named function integrated over time of the existence of said last-named function being dependent on the relative quantities in said specimen of said last-named components, integrating over time the areas on each side of said axis, and determining from said areas the relative quantity, in said specimen, of said major component and comparing the area on one side of said axis with the area, on the other side of said axis to detect each said minor component and to determine the relative quantity of each said minor component.

2. The method of determining if the concentration of a gas component in a first gas specimen is different from that in a second gas specimen the said method comprising passing each of said specima in its turn at a predetermined time rate, through a medium which absorbs, and is selectively saturated by, said component, passing the resulting gas for each specimen emitted by said medium through measuring means to derive respective signals as a function of time dependent on the concentration of said component in said specima and the rate at which said component saturates said medium, deriving a time function for each of said specima, said time function having a maximum point, the time interval from the start of said function for each specimen to the instant of occurrence of said maximum point being herein called $(t_p)$, the time interval from the start of each said function to the center of area of said last-named function being herein called $(t_{o1})$, the time duration of each said function being herein called $(t_B)$ and the height of each said function being herein called $h$, and comparing the ratio of one of $(t_p)$, $(t_{o1})$, $(t_B)$ and $h$ to another of said last-named parameters for the function corresponding to one of said specima with the ratio of the same pair of parameters $(t_p)$, $(t_{o1})$, $(t_B)$ and $h$ for the function corresponding to the other of said specima differences between the said ratios measured for said first and second specima being correlated to differences in concentration of said components in said first and second specima and/or to the presence of minor components, if any, in said first and second specima.

3. The method of claim 2 wherein the ratio $(t_{o1}/t_p)$, or its reciprocal, for the funcion corresponding to one specimen is compared with the ratio $(t_{o1}/t_p)$, or its reciprocal respectively, for the function corresponding to the other specimen.

4. The method of claim 2 wherein the ratio $(t_p/t_B)$, or its reciprocal, for the function corresponding to one specimen is compared with the ratio $(t_p/t_B)$, or its reciprocal respectively, for the function corresponding to the other specimen.

5. The method of determining the major components of the composition of a specimen of a gas and the minor components, if any, associated with each major component, the said method comprising passing said specimen, at a predetermined time rate, through a meduim which absorbs and is selectively saturated by, said major and minor components, passing the resulting gas progressively emitted by said medium through measuring means to derive a signal as a function of time dependent on the component composition of said gas and the rate at which the components of said composition saturate said medium, deriving a time function for each said major component and the associated minor components, if any, said time function having at least one maximum point and the time of occurrence of said function being dependent on the medium-saturation capability of said last-named components and the area of said function integrated over time of the existence of said function being dependent on the relative quantities in said specimen of said last-named components, determining the number of points of inflexion on each side of said maximum point of said function, comparing the number of points of inflexion on one side of said maximum point with the number on the other side of said maximum point, detecting the presence of said associated last-named minor component from a difference between the number of points of inflexion on one side and the number of points of inflexion on the other side of said maximum, and integrating over time the areas on each side of the axis of a function corresponding to a major component of the specimen and associated minor components, if any, and by comparing the area on one side of said axis with the area on the other side of said axis determining the relative quantity of said minor component in said specimen.

* * * * *